US010558729B2

(12) United States Patent
Grieb et al.

(10) Patent No.: US 10,558,729 B2
(45) Date of Patent: Feb. 11, 2020

(54) ENHANCED COLLECTION ENVIRONMENTS

(71) Applicant: Microsoft Corporation, Redmond, WA (US)

(72) Inventors: Doreen N. Grieb, Kirkland, WA (US); Jaimin K. Gandhi, Redmond, WA (US); Samantha S. Yang, St. Louis, MO (US); Isaiah Ng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1042 days.

(21) Appl. No.: 13/690,964

(22) Filed: Nov. 30, 2012

(65) Prior Publication Data

US 2014/0157102 A1   Jun. 5, 2014

(51) Int. Cl.
G06F 3/00 (2006.01)
G06F 17/00 (2019.01)

(52) U.S. Cl.
CPC .................................. *G06F 17/00* (2013.01)

(58) Field of Classification Search
CPC ...... G06F 17/24; G06F 17/211; G06F 17/241; G06F 17/00; G11B 27/105; G11B 27/34
USPC ................................. 715/230, 201, 704, 716
See application file for complete search history.

(56) References Cited

U.S. PATENT DOCUMENTS

| 6,230,169 | B1* | 5/2001 | Nagae .................... G06F 17/241 |
| | | | 715/203 |
| 7,263,659 | B2* | 8/2007 | Hull et al. .................... 715/716 |
| 7,647,555 | B1 | 1/2010 | Wilcox et al. |
| 7,689,712 | B2 | 3/2010 | Lee et al. |
| 7,774,799 | B1* | 8/2010 | Sellers et al. ................. 719/329 |
| 7,779,355 | B1* | 8/2010 | Erol et al. ..................... 715/273 |
| 7,962,482 | B2 | 6/2011 | Handman et al. |
| 2002/0099552 | A1* | 7/2002 | Rubin et al. .................. 704/270 |
| 2002/0198909 | A1* | 12/2002 | Huynh ................... G06Q 30/02 |
| | | | 715/201 |

(Continued)

FOREIGN PATENT DOCUMENTS

| CN | 102016760 A | 4/2011 |
| JP | H06343146 A | 12/1994 |
| WO | 2008/150924 A1 | 12/2008 |

OTHER PUBLICATIONS

"International Search Report & Written Opinion for PCT Patent Application No. PCT/US2013/072525", dated Apr. 4, 2014, Filed Date: Nov. 30, 2013, 8 Pages.

(Continued)

*Primary Examiner* — Scott T Baderman
*Assistant Examiner* — Hassan Mrabi

(57) ABSTRACT

Systems, methods, and software for facilitating enhanced collection environments are disclosed. In at least one implementation, a collection environment is presented that includes a presentation recording and a written paragraph. The presentation recording includes presentation sections while the paragraph includes written sections. A user input may be directed to the written paragraph. One of the written paragraphs is identified as corresponding to the user input. In addition, one the presentation sections is identified as corresponding to the written section. A media function can then be applied to the presentation section in the presentation recording.

20 Claims, 8 Drawing Sheets

(56) References Cited

U.S. PATENT DOCUMENTS

| | | | | |
|---|---|---|---|---|
| 2003/0217330 | A1* | 11/2003 | Shelley | G06F 17/24 715/201 |
| 2005/0210101 | A1 | 9/2005 | Janik | |
| 2006/0075347 | A1* | 4/2006 | Rehm | 715/727 |
| 2007/0266304 | A1* | 11/2007 | Fletcher et al. | 715/500.1 |
| 2008/0263010 | A1* | 10/2008 | Roychoudhuri et al. | 707/3 |
| 2008/0282138 | A1* | 11/2008 | Barthelmess et al. | 715/201 |
| 2009/0027400 | A1 | 1/2009 | Marggraff et al. | |
| 2009/0066722 | A1* | 3/2009 | Kriger et al. | 345/619 |
| 2010/0083136 | A1* | 4/2010 | Komine | G06F 9/52 715/753 |
| 2010/0125791 | A1* | 5/2010 | Katis et al. | 715/716 |
| 2010/0324709 | A1* | 12/2010 | Starmen | G06F 17/241 700/94 |
| 2011/0231474 | A1* | 9/2011 | Locker et al. | 709/203 |
| 2012/0173281 | A1* | 7/2012 | DiLella et al. | 705/3 |
| 2012/0321062 | A1* | 12/2012 | Fitzsimmons et al. | 379/142.17 |
| 2014/0006947 | A1* | 1/2014 | Garmark et al. | 715/716 |
| 2014/0089799 | A1* | 3/2014 | Evans | 715/716 |
| 2014/0129942 | A1* | 5/2014 | Rathod | 715/720 |
| 2014/0169767 | A1* | 6/2014 | Goldberg | 386/282 |

OTHER PUBLICATIONS

"Media Playback;" Aug. 14, 2012; pp. 1-19; http://developer.android.com/guide/topics/media/mediaplayer.html.

Sharon Vaknin; "How to Take better notes with the Echo Smartpen," Aug. 10, 2012; pp. 1-12; http://howto.cnet.com/8301-11310_39-57488709-285/take-better-notes-with-the-echo-smartpen/.

Blueberry Software; "BB TestAssistant;" Aug. 16, 2012; pp. 1-2; http://www.bbsoftware.co.uk/BBTestAssistant/Support.aspx?Ing=ja.

PRWEB; "TapNotes App Makes Reviewing Meeting, Lecture Recordings Easier," Jun. 19, 2012; pp. 1-4; Vocus PRW Holdings, LLC; http://www.prweb.com/releases/2012/6/prweb9618692.htm.

"Office Action Issued in Japanese Patent Application No. 2015-545489", dated Feb. 27, 2018, 6 Pages.

"Second Office Action Issued in Chinese Patent Application No. 201380062230.4", dated Nov. 3, 2017, 12 Pages.

"Office Action and Search Report Issued in Chinese Patent Application No. 201380062230.4", dated Feb. 16, 2017, 11 Pages.

"Office Action Issued in Japan Patent Application No. 2015-545489", dated Aug. 2, 2017, 8 Pages.

"Livescribe (TM) Desktop for Mac User Guide Version 2.3.1", Retrieved from: https://www.livescribe.com/enus/media/pdf/support/LivescribeDesktopUserManual_MacOSX.pdf, Nov. 3, 2010, 88 Pages.

"Office Action Issued in European Patent Application No. 13815204.6", dated Apr. 23, 2019, 6 Pages.

"Office Action Issued in European Patent Application No. 13815204.6", dated May 2, 2018, 5 Pages.

"Office Action Issued in Chinese Patent Application No. 201380062230.4", dated May 29, 2018, 9 Pages.

"Office Action Issued in Japanese Patent Application No. 2015-545489", dated Aug. 29, 2018, 5 Pages.

* cited by examiner

ENHANCED COLLECTION ENVIRONMENTS

TECHNICAL FIELD

Aspects of the disclosure are related to computer hardware and software technology, and in particular, to note taking applications and other collection environments.

TECHNICAL BACKGROUND

Much like a physical notebook, note taking applications allow notes, photos, and other useful information and items to be captured and organized for later reference. Many note taking applications also provide recording tools for capturing audio and video presentations. Written notes can be typed, but many applications also support hand-written notes. In either case, written notes are indexed along with the other information, such as an audio recording or web clipping, to allow for quick searching and retrieval functions.

One feature in many note taking applications is the ability to temporally index information across a variety of information formats. As information is entered into a collection environment, the information is time-stamped such that it can be linked to other time-stamped information. Such an arrangement allows the later presentation of one set of information to be synchronized with another set of information.

For instance, a user may attend a lecture during which she generates written notes pertaining to the lecture, as well as an audio recording of the lecture. The written notes can be indexed to the recording on a per-paragraph basis such that the later presentation of either may be synchronized with the other. For example, upon clicking on or touching a particular paragraph in the lecture notes, the playback of the audio recording can jump to a selection corresponding to the indicated paragraph. In another example, the presentation of the lecture notes can symbolically track the playback of the audio recording, such as by graphically highlighting each corresponding paragraph as the audio playback progresses.

OVERVIEW

Provided herein are systems, methods, and software for facilitating enhanced collection environments. In at least one implementation, a collection environment is presented that includes a presentation recording and a written paragraph. The presentation recording includes presentation sections while the paragraph includes written sections. A user input may be directed to the written paragraph. One of the written paragraphs is identified as corresponding to the user input. In addition, one the presentation sections is identified as corresponding to the written section. A media function can then be applied to the presentation section in the presentation recording.

In another implementation, presentation of a collection environment is initiated. The collection environment includes a presentation recording having presentation sections and includes a written paragraph having written sections. Identification of which written section corresponds to a user input directed to the written paragraph is initiated, as is which presentation section corresponds to the written section. Application of a media function to the presentation section in the presentation recording is also initiated.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for improved navigation capabilities within the context of collection environments. In some implementations, a user may interface with written notes on a per-section basis in order to navigate or otherwise interact with an associated presentation recording. Another scenario may also be possible whereby a user may interface with a presentation recording in order to interact with sections of a written paragraph. Other features may also be available, such as the ability to apply media controls or functions to a presentation recording through interaction with sections of a written paragraph.

Figure 2:
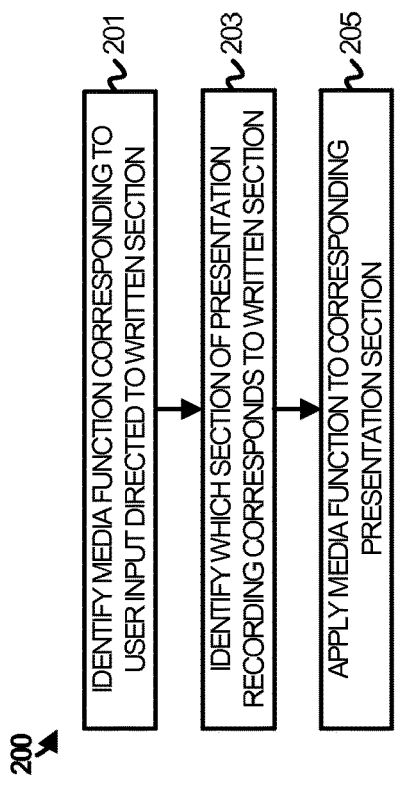
FIG. 2 illustrates a control process in an implementation.
Figure 3:
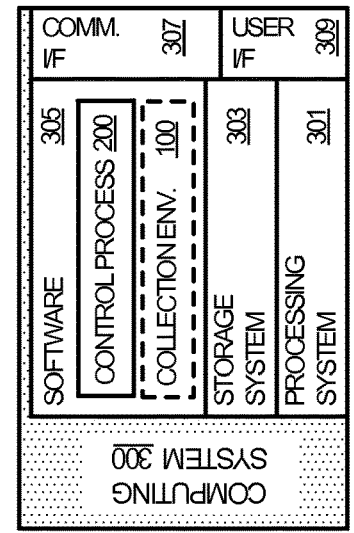
FIG. 3 illustrates a computing system in an implementation.
Figure 1:
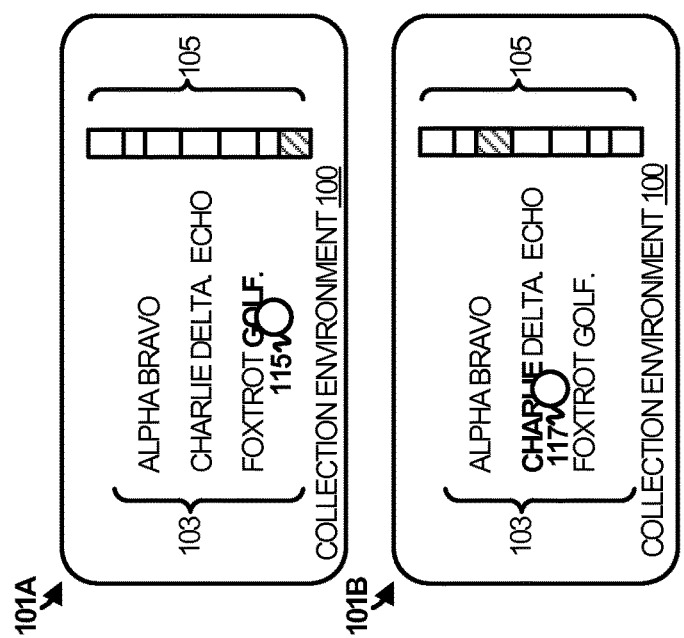
FIG. 1 illustrates views of a collection environment in an implementation.

Referring now to the drawings, FIG. 1 illustrates two views of a collection environment with respect to which a control process, illustrated in FIG. 2, may be understood. FIG. 3 illustrates a computing system suitable for implementing the control process and optionally the collection environment. FIGS. 4-10 illustrate various sequential views involving the application of a control process to collection pages, and recording screens.

Turning to FIG. 1, two views 101A and 101B of collection environment 100 are illustrated. Collection environment 100 includes written paragraph 103 and presentation recording 105. Collection environment 100 may be any environment in which various kinds of information in various formats may be collected. Examples of information that may be collected include typed written text, hand-written text, audio recordings, video recordings, images, website clippings, a document presentation recording, slide show recordings, an instant message recording, spreadsheet tables, screen clippings, attached files, scanner results, and date and time information, as well as any other suitable information or collected items.

Collection environment 100 may be rendered by executing a dedicated note taking application, such as Microsoft® OneNote®. However, collection environment 100 may also be rendered by other types of productivity applications, such as dedicated word processing, spreadsheet, presentation, or publishing applications. Collection environment 100 may also be rendered by executing other types of applications, such as operating system utilities and components, gaming applications, embedded applications, or any other type of program capable of collecting various kinds of information in various formats.

Written paragraph 103 and presentation recording 105 each include sections. The sections of written paragraph 103 may be any discrete unit into which written paragraph 103 may be divided, such as individual words, paragraph lines, individual characters, a phrase, or any other suitable unit, combinations of units, or variations thereof, the size of which may be uniform or may vary. The sections of presentation recording 105 may be any discrete unit into which presentation recording 105 may be divided, such as chunks, frames, slides, and images, as well as any other suitable unit, combination of units, or variations thereof, the size of which may be uniform or may vary.

Sections of a written paragraph 103 and sections of a presentation recording 105 are collected by way of collection environment 100. The sections of the written paragraph 103 may be input in a variety of ways, such as typing, handwriting recognition, or any of suitable mechanism. The sections of the presentation recording 105 may be recorded using any suitable component of collection environment 100, any stand-alone application, or any component of any other application capable of recording presentations, such as audio or video presentations, virtual white board presentations, chat sessions, or the like.

At least some of the sections of the written paragraph 103 and some of the sections of the presentation recording 105 may be generated at the same time. In addition, which sections of the written paragraph 103 correspond to which sections of the presentation recording 105 may be tracked. For instance, a user may generate a written paragraph when taking notes with respect to a lecture, while at the same time a recording of the lecture may be generated. The specific lines, words, or other sections of the written notes may be time stamped or otherwise tracked in some suitable fashion such that they may be linked with sections of the lecture recording. Written paragraph 103 or written text in general is merely one example of notes that could be taken, tracked, and synchronized with a presentation recording. It may also be possible to perform the functions discussed herein with respect to other types of notes, such as drawings, tables, images, and lists.

To further illustrate these aspects, the sections of the written paragraph 103 are represented by several words including alpha, bravo, charlie, delta, and so on. In addition, presentation recording 105 includes several presentation sections, each one roughly corresponding to one of the written sections. For example, the written section including the word "alpha" corresponds to the first presentation section, while the last written section including the word "golf" corresponds to the last presentation section. Accordingly, which written sections correspond to which presentation sections on a per-section basis may be tracked and the correspondence utilized to improve navigation capabilities, as will be appreciated from the various examples in this and other implementations discussed throughout.

In operation, control process 200 may be followed to improve the navigability of collection environment 100. The following discussion of control process 200 initially advances with respect to view 101A and then is repeated with respect to view 101B. In addition, view 101A and view 101B may be considered sequential to each other in order to better illustrate control process 200. In both view 101A and view 101B, a user may interact with collection environment 100 to navigate written paragraph 103 and presentation recording 105. Selecting or otherwise identifying by a user input a specific section of written paragraph 103 or a specific section of presentation recording 105 allows a media function to be applied to the identified section.

In view 101A, user input 115 may occur, in response to which the specific section of written paragraph 103 corresponding to user input 115 is identified (step 201). In this scenario, user input 115 corresponds to the word "golf" within written paragraph 103. Next, the specific section of presentation recording 105 that corresponds to the specific section of written paragraph 103 identified by user input 115 is determined (step 203). In this scenario, the word "golf" corresponds to the last or bottom most presentation section because both sections were generated at approximately the same time. A media function can then be applied to appropriate presentation section (step 205), such as by jumping to the presentations section, deleting the presentation section, or playing out presentation section, as well as any other suitable media function, combinations of media functions, or variations thereof.

In view 101B, user input 117 may occur, in response to which the specific section of written paragraph 103 corresponding to user input 117 is identified (step 201). In this scenario, user input 117 corresponds to the word "charlie" within written paragraph 103. Next, the specific section of presentation recording 105 that corresponds to the specific section of written paragraph 103 identified by user input 117 is determined (step 203). In this scenario, the word "charlie" corresponds to the third section from the top because both sections were generated at approximately the same time. A media function can then be applied to appropriate presentation section (step 205), such as by jumping to the presentations section, deleting the presentation section, or playing out presentation section, as well as any other suitable media function, combinations of media functions, or variations thereof.

When view 101A and view 101B are considered in combination, it may be appreciated how control process 200 allows a user to more easily navigate presentation recording 105 by way of written paragraph 103 on a per-section basis. The user may provide various user inputs directed to the various sections of written paragraph 103 in order to navigate the various sections of presentation recording 105. It may also be appreciated that had other words been selected within written paragraph 103 then other sections of presentation recording 105 could have been identified and selected for application of a media function. For instance, had the words "delta" or "foxtrot" been selected, then the fourth or sixth presentation section would have been jumped to, deleted, played out, or the like.

While the aforementioned scenarios dealt mainly with selecting a written section, it may also be possible to control collection environment 100 by initially selecting one of the sections of presentation recording 105. In such a scenario, a user input similar to user inputs 115 and 117 may select a section of a presentation recording, from which a corresponding section of written paragraph 103 is identified. A media function can then be applied to that section of written paragraph 103. For example, the bottom most section of presentation recording 109 may be identified as corresponding to a user input. Next, the specific section of written paragraph 103 that corresponds to the specific section of presentation recording 105 identified by user input is determined. In this scenario, the word "golf" corresponds to the bottom most section of presentation recording 105 because both sections were generated at approximately time. A media function can now be applied to the appropriate written section, such as jumping to, deleting, or highlighting the word, as well as any other suitable media function, combination, or variations thereof.

While control process 200 generally refers to identifying a media function corresponding to a user input, identifying which section of a presentation recording corresponds to a written section, and applying a media function to the presentation section, variations of control process 200 are possible. For example, a variation of control process 200 may involve initiating each of the aforementioned steps, in addition to or in place of actually performing each of the aforementioned steps. For example, a variation of control process 200 may include some or all of initiating the identification of the media function, initiating the identification of the section of the presentation recording, and initiating the application of the media function, as well as any combination or variations thereof.

Another variation of control process 200 may include other steps in addition to or in place of those discussed above. For instance, a variation of control process 200 may include initiating presentation of a collection environment that includes a presentation recording having presentation sections and presentation of a written paragraph having of written sections. The variation may also include initiating identification of which written section corresponds to a user input directed to the written paragraph and which presentation section corresponds to the identified written section. Lastly, the variation may also include initiating application of a media function to the identified presentation section.

Computing system 300, referred to in FIG. 3, may be representative of any computing apparatus, system, or systems on which control process 200 or variations thereof may be suitably implemented. Optionally, computing system 300 may also be suitable for implementing all of or portions of collection environment 100. Implementing control process 200 or variations thereof may include local execution, streaming execution, or hosted execution of control process 200, or any combination or variation thereof. Examples of computing system 300 include mobile computing devices, desktop computers, cell phones, tablet computers, laptop computers, notebook computers, media devices, and gaming devices, as well as any other type of mobile computing devices and any combination or variation thereof. Examples of computing system 300 also include server computers, cloud computing platforms, and virtual machines, as well as any other type of computing system, variation, or combination thereof.

Computing system 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for control process 200 or variations thereof. Computing system 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 303 may also include communication media over which software 305 may be communicated. Storage system 303 may be implemented as a single storage device but may also be implemented across multiple storage devices or sub-systems co-located or distributed relative to each other. Storage system 303 may comprise additional elements, such as a controller, capable of communicating with processing system 301.

Software 305 may be implemented in program instructions and among other functions may, when executed by computing system 300 in general or processing system 301 in particular, direct computing system 300 or processing system 301 to operate as described herein for control process 200. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform computing system 300 overall from a general-purpose computing system into a special-purpose computing system customized to facilitate collection environments as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement control process 200 (and variations thereof) and optionally all or portions of collection environment 100.

However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to collection environment 100. As an example, collection environment 100 could be considered transformed from one state to another when subject to control process 200 or variations thereof. In a first state, computing system 300 may render view 101A of collection environment 100, whereby the word "golf" is selected and a media function applied accordingly to a corresponding section of presentation recording 105. In view 101B, upon a selection of a different word within written paragraph 103, such as the word "charlie," a media function is applied accordingly to a different corresponding section of presentation recording 105. In other words, presentation recording 105 or the function thereof is transformed from one view to the next in a dynamic fashion driven by user interaction with corresponding sections of written paragraph 103.

Referring again to FIG. 3, communication interface 307 may include communication connections and devices that allow for communication between computing system 300 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 309. In some cases, the input and output devices may be combined in a single device, such as a display capable of displaying images and receiving touch gestures. The aforementioned user input and output devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

Figure 4:
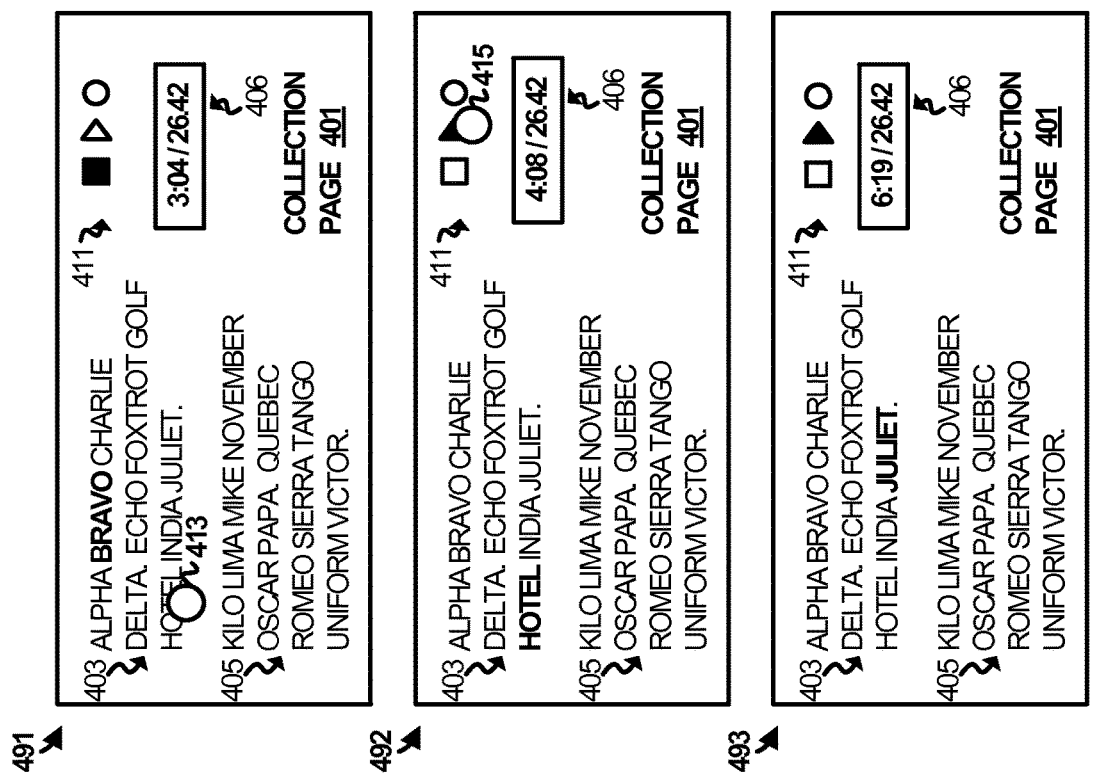
FIG. 4 illustrates several sequential views of a collection page in an implementation.

FIG. 4 illustrates several views 491-493 of collection page 401 to demonstrate one particular implementation of control process 200 or variations thereof. Collection page 401 includes written paragraph 403, time display 406, and media controls 411. Collection page 401 may be any page within a collection environment in which various kinds of information in various formats may be collected. Examples of information that may be collected include typed written text, hand-written text, audio recordings, video recordings, images, website clippings, spreadsheet tables, screen clippings, attached files, scanner results, virtual white board presentations, and date and time information, as well as any other suitable information.

Collection page 401 may be rendered by executing a dedicated note taking application, such as Microsoft® OneNote®. However, collection page 401 may also be rendered by other types of productivity applications, such as dedicated word processing, spreadsheet, presentation, or publishing applications. Collection page 401 may also be rendered by executing other types of applications, such as operating system utilities and components, gaming applications, embedded applications, or any other type of program capable of collecting various kinds of information in various formats.

Written paragraph 403 and written paragraph 405 each include written sections. The written sections may be any discrete unit into which written paragraphs 403 and 405 may be divided, such as words, paragraph lines, individual characters, or any other suitable unit, combinations of units, or variations thereof, the size of which may be uniform or may vary. Each section of written paragraphs 403 and 405 may be input in a variety of ways, such as typing, handwriting recognition, or any other suitable mechanism.

At least some of the sections of written paragraphs 403 and 405 may correspond to sections of a presentation recording generated at approximately the same time as those sections of written paragraphs 403 and 405. The sections of the presentation recording (not shown) may be recorded using any suitable recording component of a note taking application, stand-alone application, or any component of any other application capable of recording presentations, such as audio or video presentations, virtual white board presentations, chat sessions, or the like. In addition, the sections of the presentation recording may be any discrete unit into which the presentation recording may be divided, such as chunks, frames, slides, and images, as well as any other suitable unit, combination of units, or variations thereof, the size of which may be uniform or may vary.

Which sections of written paragraphs 403 and 405 correspond to which sections of the presentation recording can be tracked to allow for later synchronization. For instance, a user may generate a written paragraph when taking notes with respect to a meeting, while at the same time a recording of the meeting may be generated. The specific lines, words, or other sections of the written notes may be time stamped or otherwise tracked in some suitable fashion such that they may be linked with sections of the meeting recording and later played back in a synchronized fashion.

Time display 406 is a graphic representative of a presentation recording (not shown), such as an audio or video recording, that tracks the performance of the presentation recording as medial controls 411 or other controls are applied to it. Time display 406 includes both the total time of the recording and the present or most recently reached position in the recording as measured in time units. In this example, the presentation recording is twenty-six minutes and forty-two seconds long. Media controls 411 include a stop control, a play control, and a record control. As these and other controls are applied to the presentation recording, the location in the recording implicated by the controls is display by time display 406. For example, as the presentation recording is played out, the present time advances. In another example, fast forwarding, rewinding, or otherwise jumping to other sections of the presentation recording may result in the present time moving forward, backward, or the like, in accordance with where in the presentation play out has commenced.

Another way in which the performance of a presentation recording is communicated is by highlighting sections of written paragraph 403 and 405 as corresponding sections of the presentation recording are implicated. For example, as the presentation recording is played out, the section of written paragraph 403 or 405 corresponding to the section of the presentation recording being played can be highlighted or otherwise noted as implicated by the recording. In another example, fast forwarding, rewinding, or otherwise jumping to other sections of the presentation recording, either by interacting with sections of written paragraphs 403 and 405 or interacting with a graphical representation of the recording, may result in the highlighted portion of the written paragraph moving forward, backward, or the like through its various sections.

To understand these and other aspects, an operational sequence is provided by views 491, 492, and 493. Beginning with view 491, collection page 401 is presented with the recording in a stopped state at three minutes and four seconds, as denoted by time display 406 and by the stop control having been selected from media controls 411. Collection page 401 is capable of highlighting the words or other sections of written paragraphs 403 and 405 as each corresponding section of the recording is played out. Thus, at the moment of stopping the recording, the word "bravo" is highlighted to indicate the position in written paragraph 403 corresponding to where in the recording it was stopped three minutes and four seconds.

Continuing with the operation of collection page 401 provided by view 491, a control process similar to control process 200 or variations thereof may be followed to improve the navigability of collection page 401. A user may interact with collection page 401 to navigate written paragraphs 403 and 405 and the presentation recording controlled by media controls 411 and represented by time display 406. Selecting or otherwise identifying by a user input a specific section of written paragraph 403 or 405 or a specific section of the presentation recording allows a media function to be applied to the identified section.

In view 491, user input 413 may occur, in response to which the specific section of written paragraph 403 corresponding to user input 413 is identified. In this scenario, user input 413 corresponds to the word "hotel" within written paragraph 403. Next, the specific section of the presentation recording that corresponds to the specific section of written paragraph 403 identified by user input 413 is determined or otherwise identified. In this scenario, the word "hotel" corresponds to a section four minutes and eight seconds into the presentation recording. Indeed, this may be appreciated by the advancing of time display 406 in view 492 relative to view 491.

In particular, time display 406 has advanced from three minutes and four seconds in view 491 to four minutes and eight seconds in view 492. This roughly corresponds to how the highlighted portion of written paragraph 403, tracking the progress of the presentation recording, advance from "bravo" to "hotel." A media function can then be applied to appropriate presentation section. In this scenario, the media function is a jump from approximately three minutes in the recording to four minutes in the recording. Another media function may also be selected by user input 415. User input 415 corresponds to the play control of media controls 411.

Play out of the presentation recording beginning at or nearby the displayed time in time display 406 can commence accordingly.

View 493 illustrates that as the play out of the recording continues, triggered by user input 415 in view 492, the individual words of written paragraph 403 continue to be highlighted. In this scenario the play out has reached six minutes and nineteen seconds, which corresponds to the highlighted word "juliet." If the illustration were to continue, the per-word emphasis would continue to sections of paragraph 405.

When views 491, 492, and 493 are considered together, it may be appreciated how navigation between written paragraphs and presentation recordings on a per-section basis is accomplished. The user may provide various user inputs directed to the various sections of written paragraphs 403 or 405 in order to navigate the various sections of the presentation recording. It may also be appreciated that had other words been selected within written paragraph 403 or 405, then other sections of the presentation recording would have been identified and selected for application of a media function.

While the aforementioned scenarios dealt mainly with selecting a written section, it may also be possible to control collection page 401 by initially selecting one of the sections of the presentation recording. For instance, it may be possible to input a desired time into time display 406. In some scenarios, up and down arrows or other similar controls may be provided allowing the user to advance or rewind time display 406 to a different time. In such a scenario, a user input may select a section of the presentation recording, from which a corresponding section of written paragraph 403 or 405 is identified. A media function can then be applied to that section of the written paragraph.

For example, time display 406 may be advanced to twenty-six minutes by a user input. Next, the specific section of written paragraph 405 that corresponds to the specific section of the presentation recording at twenty-six minutes identified by the user input is determined. In this scenario, the word "uniform" is assumed to correspond to the twenty-six minute marker of the recording. A media function can then be applied to the appropriate written section, such as jumping to, deleting, or highlighting the word, as well as any other suitable media function, combination, or variations thereof.

Figure 5:
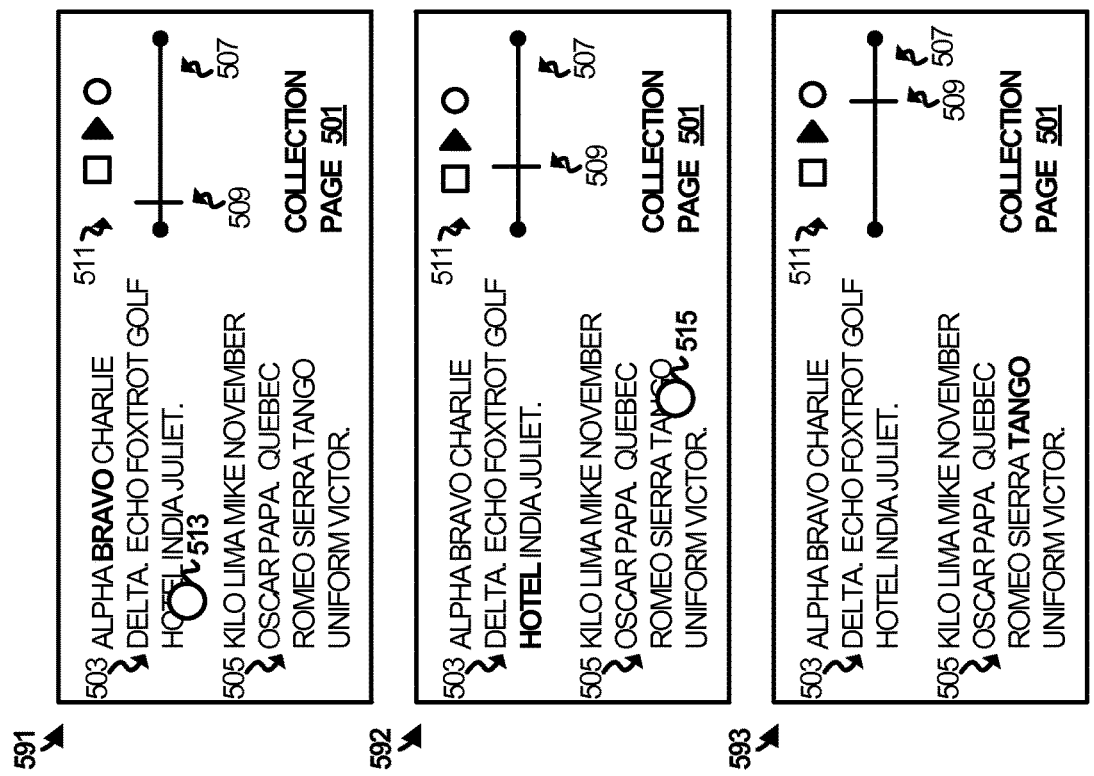
FIGS. 5-6 illustrate several sequential views of a collection page in an implementation.

FIG. 5 illustrates several views 591-593 of collection page 501 to demonstrate another implementation of control process 200. Collection page 501 includes written paragraph 503, written paragraph 505, time bar 507, and media controls 511. Collection page 501 may be any page within a collection environment in which various kinds of information in various formats may be collected. Examples of information that may be collected include typed written text, hand-written text, audio recordings, video recordings, images, website clippings, spreadsheet tables, screen clippings, attached files, scanner results, virtual white board presentations, and date and time information, as well as any other suitable information.

Collection page 501 may be rendered by executing a dedicated note taking application, such as Microsoft® OneNote®. However, collection page 501 may also be rendered by other types of productivity applications, such as dedicated word processing, spreadsheet, presentation, or publishing applications. Collection page 501 may also be rendered by executing other types of applications, such as operating system utilities and components, gaming applications, embedded applications, or any other type of program capable of collecting various kinds of information in various formats.

Written paragraph 503 and written paragraph 505 each include written sections. The written sections may be any discrete unit into which written paragraphs 503 and 505 may be divided, such as words, paragraph lines, individual characters, or any other suitable unit, combinations of units, or variations thereof, the size of which may be uniform or may vary. Each section of written paragraphs 503 and 505 may be input in a variety of ways, such as typing, handwriting recognition, or any other suitable mechanism.

At least some of the sections of written paragraphs 503 and 505 may correspond to sections of a presentation recording generated at approximately the same time as those sections of written paragraphs 503 and 505. The sections of the presentation recording (not shown) may be recorded using any suitable recording component of a note taking application, stand-alone application, or any component of any other application capable of recording presentations, such as audio or video presentations, virtual white board presentations, chat sessions, or the like. In addition, the sections of the presentation recording may be any discrete unit into which the presentation recording may be divided, such as chunks, frames, slides, and images, as well as any other suitable unit, combination of units, or variations thereof, the size of which may be uniform or may vary.

Which sections of written paragraphs 503 and 505 correspond to which sections of the presentation recording can be tracked, allowing for synchronized playback. For instance, a user may generate a written paragraph when taking notes with respect to a meeting, while at the same time a recording of the meeting may be generated. The specific lines, words, or other sections of the written notes may be time stamped or otherwise tracked in some suitable fashion such that they may be linked with sections of the meeting recording and replayed in a synchronized fashion.

Time bar 507 is a graphic representative of a presentation recording (not shown), such as an audio or video recording, that tracks the performance of the presentation recording as media controls 511 or other controls are applied to it. Time bar 507 includes a horizontal portion representative of the total time of the recording and a vertical bar 509 representative of the present or most recently reached position in the recording as measured in time units. Media controls 511 include a stop control, a play control, and a record control. As these and other controls are applied to the presentation recording, the location in the recording implicated by the controls is displayed by the progress of vertical bar 509 along time bar 507. For example, as the presentation recording is played out, vertical bar 509 advances. In another example, fast forwarding, rewinding, or otherwise jumping to other sections of the presentation recording may result in vertical bar 509 moving forward, backward, or the like, in accordance with where in the presentation play out has commenced.

Another way in which the performance of a presentation recording is tracked is by highlighting sections of written paragraph 503 and 505 as corresponding sections of the presentation recording are implicated. For example, as the presentation recording is played out, the section of written paragraph 503 or 505 corresponding to the section of the presentation recording being played can be highlighted or otherwise noted as implicated by the recording. In another example, fast forwarding, rewinding, or otherwise jumping to other sections of the presentation recording, either by interacting with sections of written paragraphs 503 and 505 or interacting with a graphical representation of the recording, may result in the highlighted portion of the written paragraph moving forward, backward, or the like through its various sections.

Figure 6:
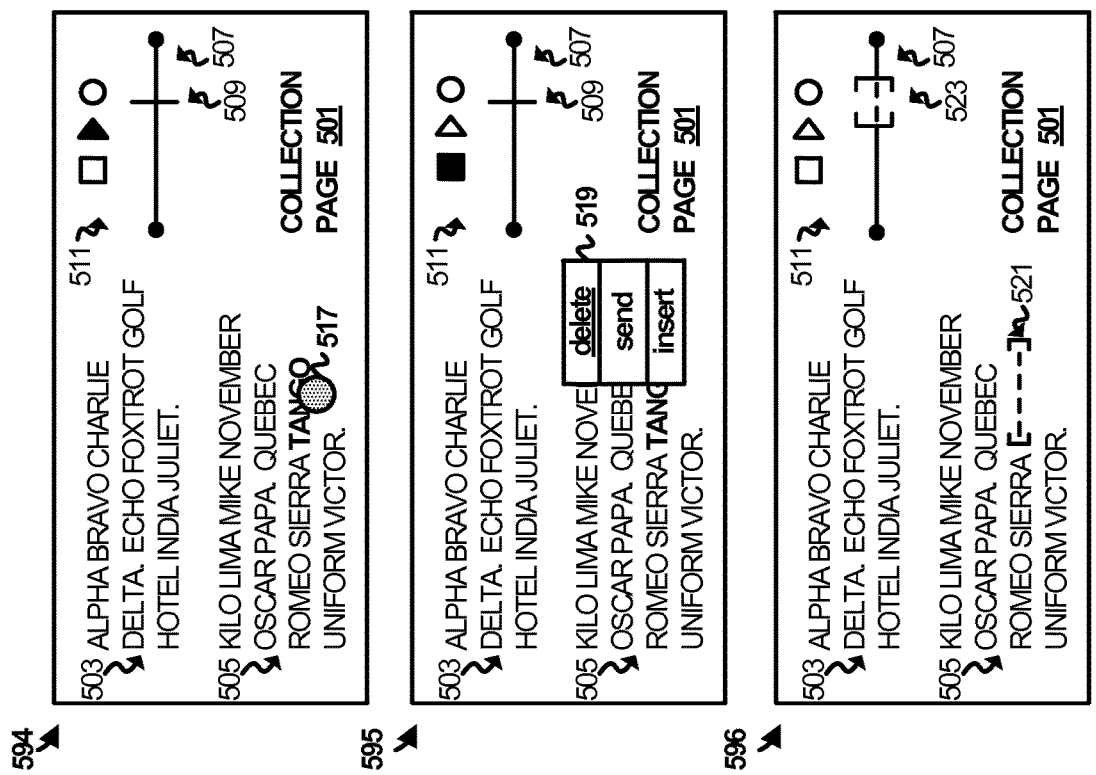

To understand these and other aspects, an operational sequence is provided by views 591-593 in FIG. 5 and continuing with views 594-596 in FIG. 6. Beginning with view 591, collection page 501 is presented with the recording in a playing state near the beginning of the recording, as denoted by the location of vertical bar 509 near the left most end of time bar 507 and by the play control having been selected from media controls 511. Thus, at the moment illustrate in view 591, the word "bravo" is highlighted to indicate the position in written paragraph 503 corresponding to the location in the being presently played out.

Continuing with the operation of collection page 501 provided by view 591, a control process similar to control process 200 or variations thereof may be followed to improve the navigability of collection page 501. A user may interact with collection page 501 to navigate written paragraphs 503 and 505 and the presentation recording controlled by media controls 511 and represented by time bar 507. Selecting or otherwise identifying by a user input a specific section of written paragraph 503 or 505 or a specific section of the presentation recording allows a media function to be applied to the identified section.

In view 591, user input 513 may occur, in response to which the specific section of written paragraph 503 corresponding to user input 513 is identified. In this scenario, user input 513 corresponds to the word "hotel" within written paragraph 503. Next, the specific section of the presentation recording that corresponds to the specific section of written paragraph 503 identified by user input 513 is determined or otherwise identified. In this scenario, the word "hotel" corresponds to a section at approximately one third of the duration of the presentation recording. Indeed, this may be appreciated by the advancing of vertical bar 509 to the right along time bar 507 in view 592 relative to its location in view 591.

In particular, vertical bar 509 has advanced from nearly the beginning of the duration along time bar 507 to approximately one-third of the duration along time bar 507. This roughly corresponds to how the highlighted portion of written paragraph 503, tracking the progress of the presentation recording, advance from "bravo" to "hotel." A media function can then be applied to appropriate presentation section.

In view 592, another user input 515 occurs, in response to which the specific section of written paragraph 503 or 505 corresponding to user input 515 is identified. In this scenario, user input 515 corresponds to the word "tango" within written paragraph 505. Next, the specific section of the presentation recording that corresponds to the specific section of written paragraph 505 identified by user input 515 is determined or otherwise identified. In this scenario, the word "tango" corresponds to a section at approximately two-thirds of the duration of the presentation recording. Indeed, this may be appreciated by the advancing of vertical bar 509 to the right along time bar 507 in view 593 relative to its location in view 592.

In particular, vertical bar 509 has advanced from about one-third of the duration along time bar 507 to approximately two-thirds of the duration along time bar 507. This roughly corresponds to how the highlighted portion of written paragraphs 503 and 505, tracking the progress of the presentation recording, advance from "hotel" to "tango." A media function can then be applied to appropriate presentation section.

Referring now to view 594 in FIG. 6, another media function may be selected by way of user input 517. Following user input 515, which selected the word "tango," user input 517 triggers display of a function menu 519. Function menu 519 provides several functions, including delete, send and insert functions, from which a selection can be made for manipulating written paragraph 505. For instance, a user may delete a written section, send a written section by some sending mechanism, or insert additional text in a portion of written paragraph 505 nearby the selected written section.

In this example, the delete function is selected in view 595 as represented by its underlined font. This may result in either or both of the deletion of the selected written section of paragraph 505 and the deletion of the corresponding section of the presentation recording. In view 596 the deletion of the written section is represented by deleted section 521 while the deletion of the corresponding section of the presentation recording is represented by deleted section 523.

While this example involves deleting a written section from paragraph 505, other functions such as the send and insert function are possible. With respect to the send function, either the identified written section, the corresponding section of the presentation recording, or both, could be sent to a destination. For example, the identified written section, presentation section, or both, could be emailed, shared, or otherwise transferred to a destination. With respect to the insert function, additional text could be inserted nearby the identified written section, causing a resynchronization of the presentation recording with at least a portion of written paragraph 505. For example, if additional text is inserted after the word "tango," then the words previously following "tango," such as "uniform" and "victor" would now correspond to later sections of the presentation recording.

Note that while the written sections in views 591-596 are represented by individual words, sections may include more than just individual words. Rather, written sections may include groups of words, individual lines, multiple lines, individual sentences, or even groups of sentences. Thus, upon a user input that invokes a function menu, entire sentences or other types of written sections may be deleted or sent to a destination, or additional text inserted therein.

Figure 7:
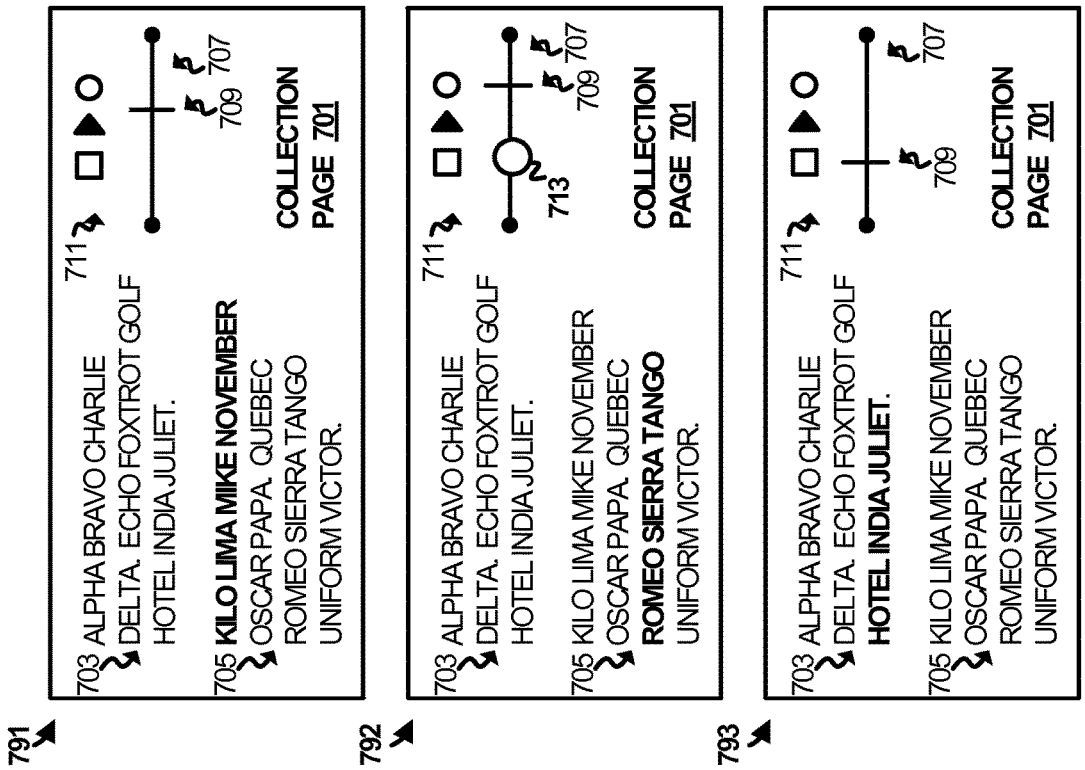
FIGS. 7-8 illustrate several sequential views of a collection page in an implementation.

While the aforementioned scenarios dealt mainly with selecting a written section, it may also be possible to a control collection page by initially selecting one of the sections of a presentation recording, as may be appreciated from views 791-796 in FIG. 7. Referring to FIG. 7, collection page 701 includes written paragraph 703, written paragraph 705, time bar 707, and media controls 711. Collection page 701 may be any page within a collection environment in which various kinds of information in various formats may be collected. Examples of information that may be collected include typed written text, hand-written text, audio recordings, video recordings, images, website clippings, spreadsheet tables, screen clippings, attached files, scanner results, virtual white board presentations, and date and time information, as well as any other suitable information.

Collection page 701 may be rendered by executing a dedicated note taking application, such as Microsoft® OneNote®. However, collection page 701 may also be rendered by other types of productivity applications, such as dedicated word processing, spreadsheet, presentation, or publishing applications. Collection page 701 may also be rendered by executing other types of applications, such as operating system utilities and components, gaming applications, embedded applications, or any other type of program capable of collecting various kinds of information in various formats.

Written paragraph 703 and written paragraph 705 each include written sections. The written sections may be any discrete unit into which written paragraphs 703 and 705 may be divided, such as words, paragraph lines, individual characters, or any other suitable unit, combinations of units, or variations thereof, the size of which may be uniform or may vary. Each section of written paragraphs 703 and 705 may be input in a variety of ways, such as typing, handwriting recognition, or any other suitable mechanism.

At least some of the sections of written paragraphs 703 and 705 may correspond to sections of a presentation recording generated at approximately the same time as those sections of written paragraphs 703 and 705. The sections of the presentation recording (not shown) may be recorded using any suitable recording component of a note taking application, stand-alone application, or any component of any other application capable of recording presentations, such as audio or video presentations, virtual white board presentations, chat sessions, or the like. In addition, the sections of the presentation recording may be any discrete unit into which the presentation recording may be divided, such as chunks, frames, slides, and images, as well as any other suitable unit, combination of units, or variations thereof, the size of which may be uniform or may vary.

Which sections of written paragraphs 703 and 705 correspond to which sections of the presentation recording can be tracked, allowing for synchronized playback. For instance, a user may generate a written paragraph when taking notes with respect to a meeting, while at the same time a recording of the meeting may be generated. The specific lines, words, or other sections of the written notes may be time stamped or otherwise tracked in some suitable fashion such that they may be linked with sections of the meeting recording and replayed in a synchronized fashion.

Time bar 707 is a graphic representative of a presentation recording (not shown), such as an audio or video recording, that tracks the performance of the presentation recording as media controls 711 or other controls are applied to it. Time bar 707 includes a horizontal portion representative of the total time of the recording and a vertical bar 709 representative of the present or most recently reached position in the recording as measured in time units. Media controls 711 include a stop control, a play control, and a record control. As these and other controls are applied to the presentation recording, the location in the recording implicated by the controls is displayed by the progress of vertical bar 709 along time bar 707. For example, as the presentation recording is played out, vertical bar 709 advances. In another example, fast forwarding, rewinding, or otherwise jumping to other sections of the presentation recording may result in vertical bar 709 moving forward, backward, or the like, in accordance with where in the presentation play out has reached.

Another way in which the performance of a presentation recording is communicated is by highlighting sections of written paragraph 703 and 705 as corresponding sections of the presentation recording are reached. For example, as the presentation recording is played out, the section of written paragraph 703 or 705 corresponding to the section of the presentation recording being played can be highlighted or otherwise noted as implicated by the recording. In another example, fast forwarding, rewinding, or otherwise jumping to other sections of the presentation recording, either by interacting with sections of written paragraphs 703 and 705 or interacting with a graphical representation of the recording, may result in the highlighted portion of the written paragraph moving forward, backward, or the like through its various sections.

To understand these and other aspects, an operational sequence is provided by views 791-793 in FIG. 7 and continuing with views 794-796 in FIG. 7. Beginning with view 791, collection page 701 is presented with the recording in a playing state near the middle of the recording, as denoted by the location of vertical bar 709 near the middle of time bar 707 and by the play control having been selected from media controls 711. Thus, at the moment illustrated in view 791, the line of paragraph 705 beginning with the word "kilo" is highlighted to indicate the position in written paragraph 705 corresponding to the location in the recording being presently played out.

Continuing with the operation of collection page 701 provided by view 791, a control process similar to control process 700 or variations thereof may be followed to improve the navigability of collection page 701. A user may interact with collection page 701 to navigate written paragraphs 703 and 705 and the presentation recording controlled by media controls 711 and represented by time bar 707. Selecting or otherwise identifying by a user input a specific section of written paragraph 703 or 705 or a specific section of the presentation recording allows a media function to be applied to the identified section.

In view 792, the play out of the recording has reached the last third of the recording, as illustrated by the position of vertical bar 709 relative to its position in view 791. In addition, the highlighted portion of written paragraphs 703 and 705 has transition from the line beginning with "kilo" to the line beginning with "romeo."

Further in view 792, user input 713 may occur, in response to which the specific section of the presentation recording corresponding to user input 713 is identified. In this scenario, user input 713 corresponds approximately to the beginning third of the recording as represented by its location approximately over the left most third of time bar 707. Next, the specific section of written paragraph 703 that corresponds to the specific section of the recording identified by user input 713 is determined or otherwise identified. In this scenario, the line beginning with the word "hotel" corresponds to the identified recording. Accordingly, that line is highlighted and vertical bar 709 is repositioned to a location along time bar 707 equal to approximately one third of the duration of the presentation recording.

While views 791-793 illustrate a jump feature accomplished by a user input 713 that identifies the location in a recording to jump to, this may also be accomplished by a slide gesture. For instance, user input 713 could implicate vertical bar 709, sliding it to the left or right along time bar 707 to a desired location in the recording. As vertical bar 709 is slid along time bar 707, the corresponding portions of written paragraphs 703 and 705 may be highlighted or otherwise enhanced accordingly. Other types of user inputs are possible and may be considered within the scope of the present disclosure.

Figure 8:
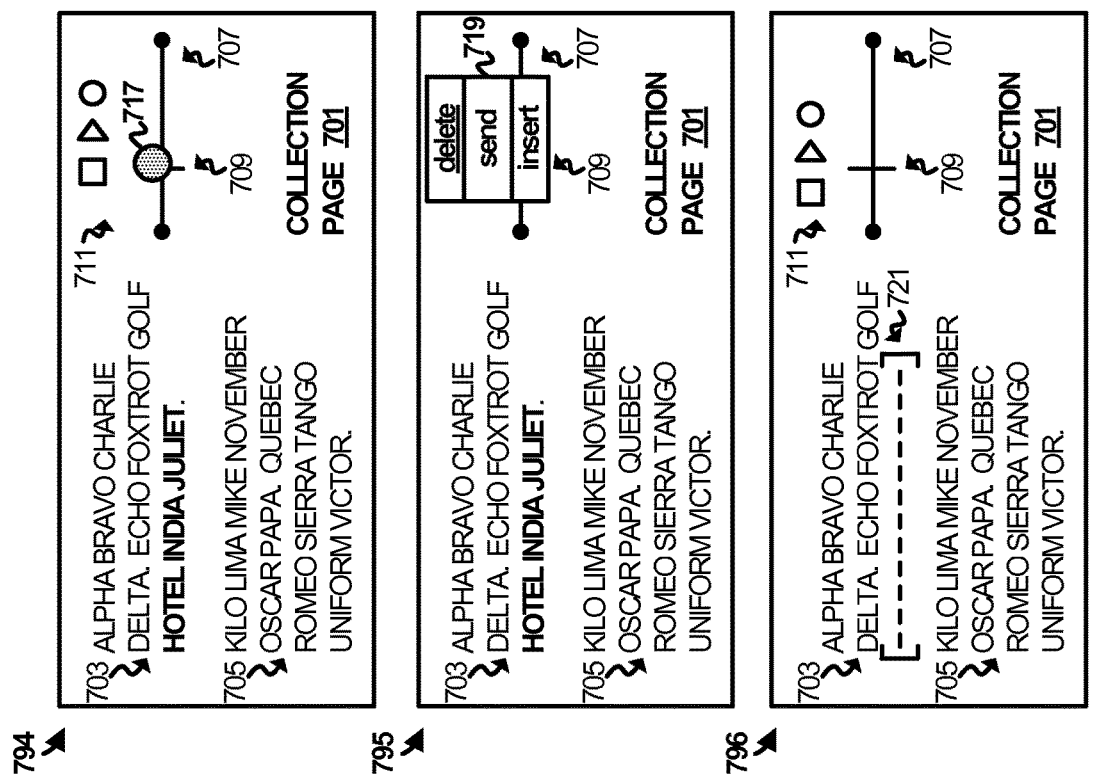

Referring now to view 794 in FIG. 8, another media function may be selected by way of user input 717. Following on user input 713, user input 717 triggers display of a function menu 719. Function menu 719 provides several functions, including delete, send and insert functions, from which a selection can be made for manipulating written paragraph 705. For instance, a user may delete a written section or recorded section, send a written section or recorded section by some sending mechanism, or insert additional text in a portion of written paragraph 703 nearby the written section corresponding to the selected recorded section. In this example, the delete function is selected in view 795 as represented by its underlined font. This may result in either or both of the deletion of the written section of paragraph 703 and the deletion of the corresponding section of the presentation recording. In view 796 the deletion of the written section is represented by deleted section 721.

While this example involves deleting a written section from paragraph 703, other functions such as the send and insert function are possible. With respect to the send function, either the identified written section, the corresponding section of the presentation recording, or both, could be sent to a destination. For example, the identified written section, presentation section, or both, could be emailed, shared, or otherwise transferred to a destination. With respect to the insert function, additional text could be inserted nearby the identified written section, causing a resynchronization of the presentation recording with at least a portion of written paragraph 703. For example, if additional text is inserted after the word "juliet," then the words previously following "juliet," including those in written paragraph 705, would now correspond to later sections of the presentation recording.

Figure 9:
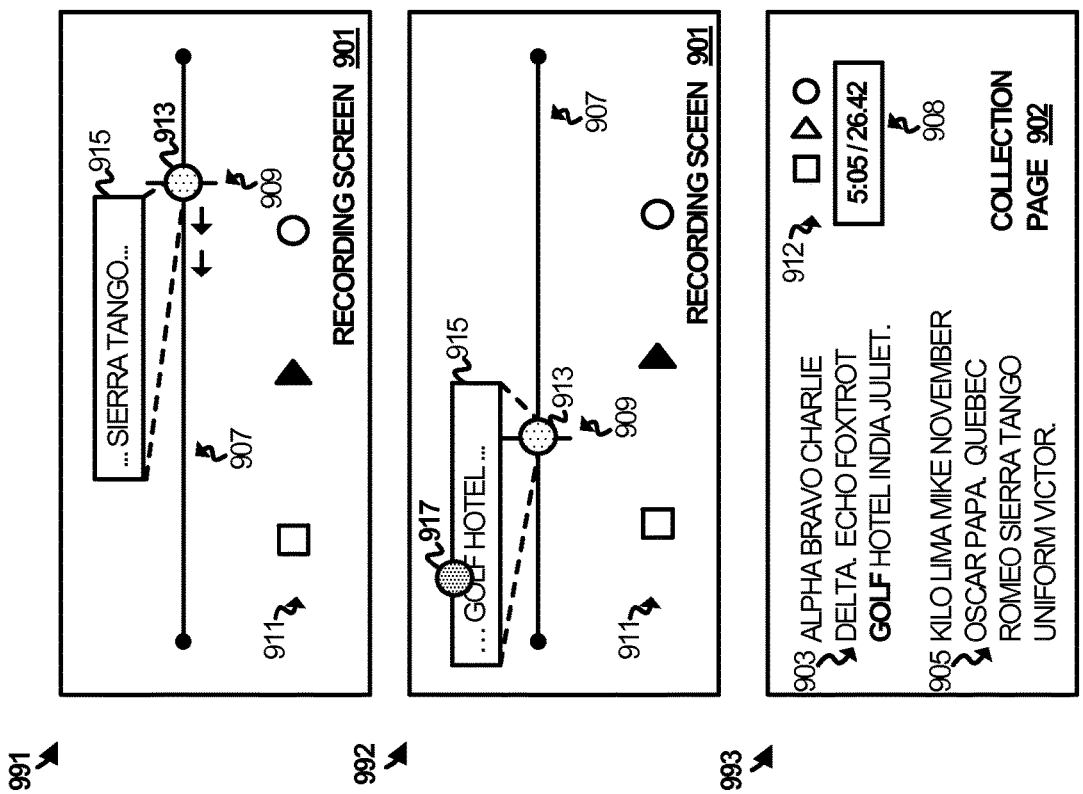
FIGS. 9-10 illustrate several sequential views of a recording screen and a collection page in an implementation.

FIG. 9 illustrates views 991 and 992 of a recording screen 901 and a view 993 of a collection page 902. In sequence, vies 991-992 serve to illustrate how a presentation recording and corresponding written paragraphs may be navigated from within a full-screen recording screen.

Recording screen 901 includes time bar 907 representative of a presentation recording, such as an audio or video recording. Recording screen 901 also includes vertical bar 909, the manipulation of which by user inputs allows a user to navigate a presentation recording on a time basis. For instance, a user may slide vertical bar 909 to the left or right along time bar 907 in order to navigate backward and forward within the presentation recording as it is played out. Recording screen 901 also includes media controls 911 with which play out of the presentation recording may be controlled.

In addition, other features may be appreciated from views 991-993. In particular, in view 991 a preview window 915 provides a preview into a written paragraph that corresponds to the presentation recording. In this example, the words "sierra" and "tango" are presented within the preview window. Jumping to view 993, it may be appreciated that the written paragraph previewed in preview window 915 can be found in written paragraph 905.

In view 991, user input 913 is a slide or swipe gesture that slides vertical bar 909 to the left, thereby moving to an earlier point in time in the presentation recording. This is represented in view 992 by different words appearing in preview window 915. In particular, preview window 915 in view 992 includes the words "golf" and "hotel." As can be understood from paragraph 903 in view 993, these words occur prior to the words earlier displayed in preview window 915 in view 991.

Continuing with view 992, another user input 917 occurs. User input 917 is directed specifically to the word "golf" and serves to cause a jump to collection page 902 in view 993. In other words, a user may switch between interfacing with a recording screen and a collection page by clicking, touching, or otherwise selecting a particular word within a preview of a written paragraph. In view 993, the word "golf" is highlighted as play out of the recording will have reached a corresponding point in time displayed in time display 908 in collection page 902. Collection page 902 also includes other features, such as media controls 912, allowing for interaction with the presentation recording.

Figure 10:
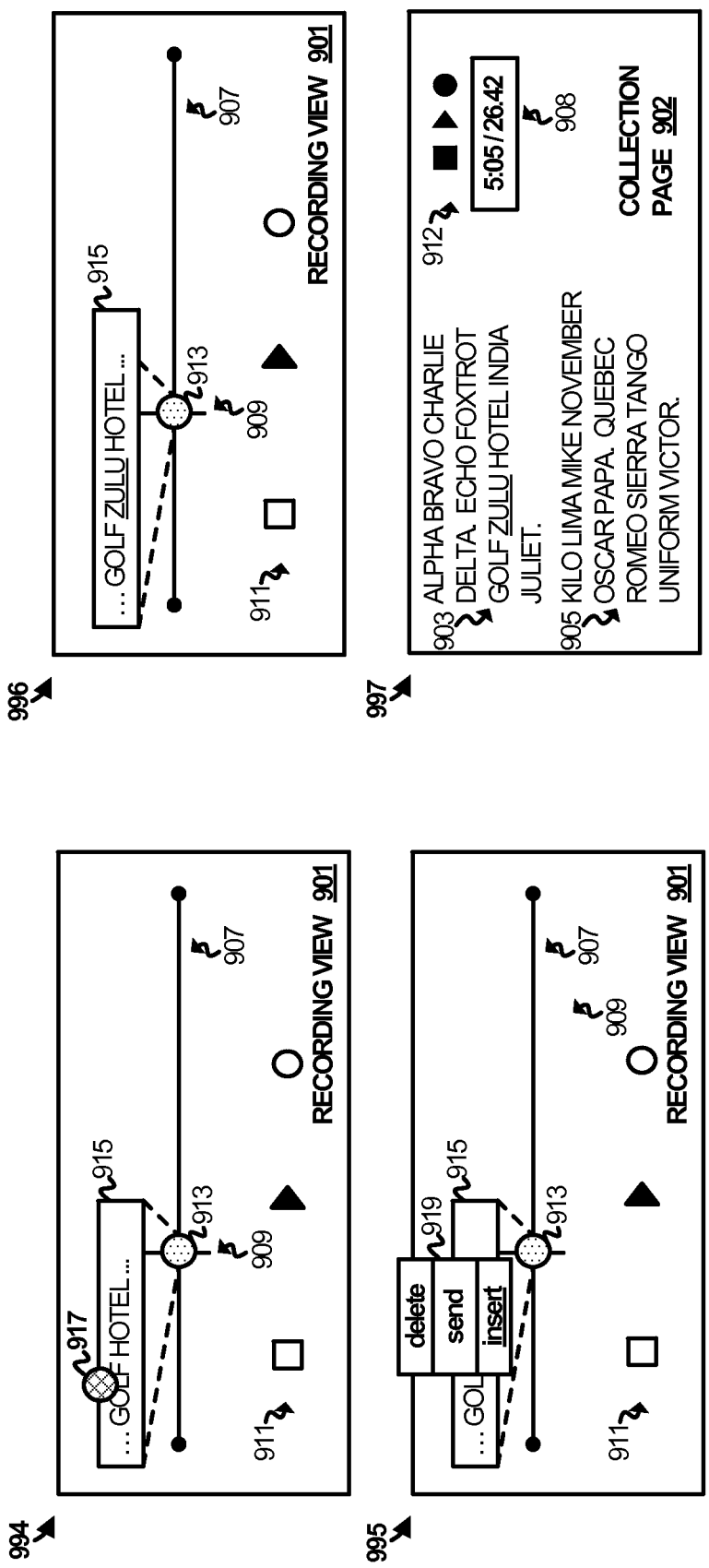

Views 994-996 in FIG. 10 illustrate several more ways in which a user may interact with a recording screen to manipulate or otherwise interact with written paragraphs in a collection page. In view 994, an alternative media function is provided in response to user input 917. User input 917 implicates the word "golf" and triggers a function menu 919, as illustrated in view 992. Function menu 919 includes delete function, send function, and insert function. In this example, the insert function is selected as indicated by its underlined font, allowing additional text to be inserted into a written paragraph through preview window 915. In particular, the word "zulu" is added to paragraph 903 in view 996. The word is entered through preview window 915, possibly by the user typing additional text, pasting additional text, or otherwise providing the additional subject matter. In view 997, the insertion of the word "zulu" between the word "golf" and "hotel" is illustrated.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

In addition, the various concepts discussed above may be applicable to other scenarios and situations beyond those disclosed herein. For example, one scenario may occur without involving a note taking application. In this scenario, written content may be presented in one environment, such as a web page or other application environment, while video is displayed nearby. The video may be displayed embedded in the web page, viewed externally to the web page, or otherwise. In either case, as the video plays, the location in the written text may be highlighted in a manner corresponding to the progress of the video. In addition, a use may touch or otherwise provide an input directed to a particular word or section of the written text, thereby causing the video to jump to a corresponding location. The user may also touch or otherwise provide an input directed to a particular section of the video, thereby causing the highlighted portion of the written text to jump to a corresponding location.

For example, a user may view a recipe on a web page, along with a video explaining how to implement the recipe. The user may navigate the video or the recipe in the aforementioned manner. In another example, a user may view written directions via a web page or application display, such as those provided by mapping services, while listening to corresponding auditory directions. The user may navigate the written directions of the auditory directions in the aforementioned manner. In yet another example, a user may use a memo-taking application provided on many mobile devices to take notes, while at the same or similar time recording a conversation or other such presentation. The note taking via the memo-taking application may be tracked and synchronized with the recording, thereby allowing the user to navigate either the notes or the recording in the aforementioned manner.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having stored thereon program instructions for facilitating control of collection environments that, when executed by a computing system, direct the computing system to at least:
    present a collection environment comprising a presentation recording having a plurality of presentation sections and a written paragraph having a plurality of written sections;
    identify which written section of the plurality of written sections corresponds to a user input directed to the written paragraph and which presentation section of the plurality of presentation sections corresponds to the written section;
    display a function menu including a plurality of media functions in response to another user input directed to the written section;
    receive a selection of a media function from the plurality of media functions; and
    apply the selected media function to the written section and the corresponding presentation section in the presentation recording such that the applied media function manipulates both the written section and the corresponding presentation section in a similar manner.

2. The one or more computer readable storage media of claim 1 wherein the program instructions, when executed by the computing system, further direct the computing system to:
    identify which one of the plurality of presentation sections corresponds to another user input directed to the presentation recording;
    identify which one of the plurality of written sections in the written paragraph corresponds to the one of the plurality of presentation sections; and
    apply another media function to the one of the plurality of written sections in the written paragraph.

3. The one or more computer readable storage media of claim 2 wherein each of the plurality of written sections corresponds to a different one of the plurality of presentation sections.

4. The one or more computer readable storage media of claim 3 wherein the program instructions, when executed by the computing system, further direct the computing system to track which of the plurality of written sections corresponds to which of the plurality of presentation sections while generating the written paragraph and the presentation recording.

5. The one or more computer readable storage media of claim 4 wherein the plurality of media functions includes a jump function and wherein to apply the jump function to the presentation section, the program instructions direct the computing system to jump to the presentation section while playing out the presentation recording.

6. The one or more computer readable storage media of claim 4 wherein the selected media function comprises a delete function and wherein to apply the delete function to the presentation section, the program instructions direct the computing system to delete at least a portion of the presentation recording including the presentation section.

7. The one or more computer readable storage media of claim 4 wherein the another media function comprises an insert function and wherein to apply the another media function to the one of the plurality of written sections, the program instructions direct the computing system to insert text adjacent to the one of the plurality of written sections.

8. The one or more computer readable storage media of claim 1 wherein each of the plurality of written sections of the written paragraph comprises a one of an individual word, line, or phrase in the written paragraph.

9. The one or more computer readable storage media of claim 8 wherein the presentation recording comprises one of an audio recording, a video recording, a document presentation recording, an instant message recording, and a virtual white board recording.

10. The one or more computer readable storage media of claim 1 wherein the user input comprises a touch gesture and wherein the program instructions direct the computing system to identify the written section in response to the touch gesture and apply the selected media function to the presentation section in response to a subsequent touch gesture.

11. A computing apparatus comprising:
one or more computer readable storage media; and
program instructions stored on the one or more computer readable storage media for facilitating control of collection environments that, when executed by a processing system, direct the processing system to at least initiate presentation of a collection page having plurality of collected items comprising a recording and notes while generating at least a portion of the recording, identify a word in the notes selected by a user input, identify a media function selected by a subsequent user input, and initiate application of the media function to the word and a section of the recording that corresponds to the word such that the application of the media function manipulates both the word and the section of the recording that corresponds to the word in a similar manner.

12. The computing apparatus of claim 11 wherein the program instructions, when executed by the processing system, further direct the processing system to track which words of the notes correspond to which sections of the recording.

13. The computing apparatus of claim 12 wherein the words in the notes correspond to different sections of the recording and wherein the program instructions, when executed by the processing system, further direct the processing system to identify which of the sections in the recording corresponds to the word selected by the user input.

14. The computing apparatus of claim 11 wherein the user input comprises a touch gesture and wherein the subsequent user input comprises a subsequent touch gesture.

15. The computing apparatus of claim 11 further comprising the processing system coupled with the one or more computer readable storage media and configured to execute the program instructions.

16. The computing apparatus of claim 11 wherein the recording comprises at least one of an audio recording, a video recording, a document presentation recording, an instant message recording, and a virtual white board recording.

17. A method of operating a collection environment, the method comprising:
initiating presentation of the collection environment, the collection environment comprising a presentation recording having a plurality of presentation sections and a written paragraph having a plurality of written sections;
initiating identification of which written section of the plurality of written sections corresponds to a user input directed to the written paragraph and which presentation section of the plurality of presentation sections corresponds to the written section;
initiating display of a function menu including a plurality of media functions in response to another user input directed to the written section;
initiating receipt of a selection of a media function from the plurality of media functions; and
initiating application of the selected media function to the written section and the corresponding presentation section in the presentation recording such that the applied media function manipulates both the written section and the corresponding presentation section in a similar manner.

18. The method of claim 17 further comprising:
identifying which one of the plurality of presentation sections corresponds to another user input directed to the presentation recording;
identifying which one of the plurality of written sections in the written paragraph corresponds to the one of the plurality of presentation sections; and
applying another media function to the one of the plurality of written sections in the written paragraph.

19. The method of claim 18 wherein each of the plurality of written sections corresponds to a different one of the plurality of presentation sections and wherein the method further comprising tracking which of the plurality of written sections corresponds to which of the plurality of presentation sections while generating the written paragraph and the presentation recording.

20. The method of claim 19 wherein the plurality of media functions comprises at least one of a play function, a jump function, and a delete function, and wherein the presentation recording comprises at least one of an audio recording, a video recording, a chat recording, a slide show recording, and a virtual white board recording.

* * * * *